July 1, 1941.　　　A. H. DICKINSON　　　2,247,908
APPARATUS FOR RECORDING STATISTICAL DATA
Filed July 25, 1939　　　6 Sheets-Sheet 1
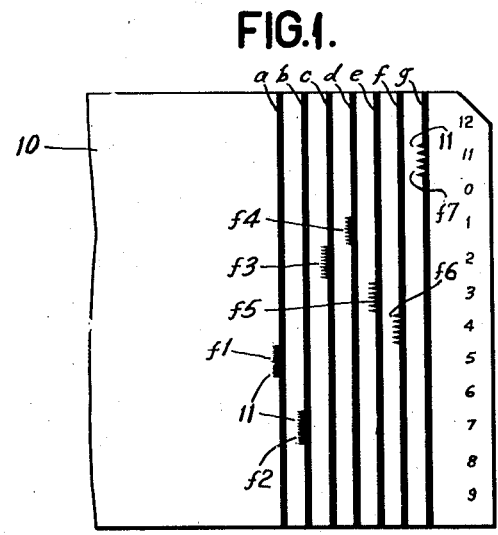
FIG. 1.
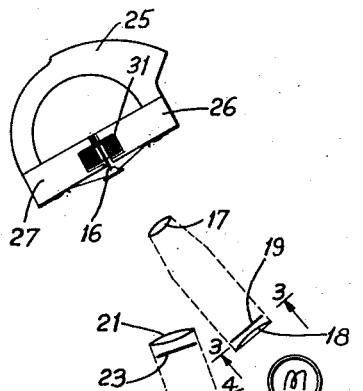
FIG. 2.
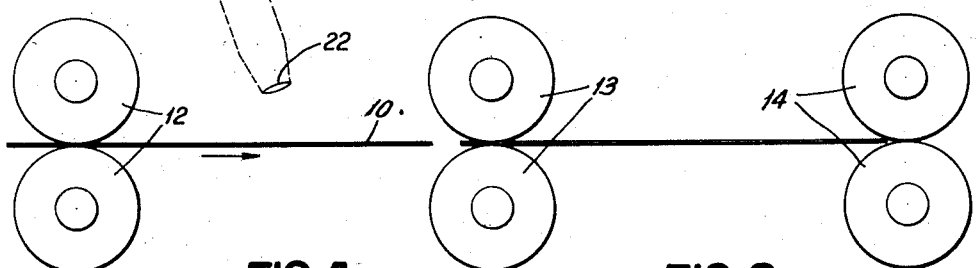
FIG. 4.　　　FIG. 3.
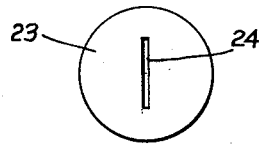 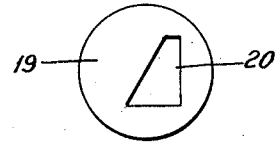
FIG. 5.　　　FIG. 7.
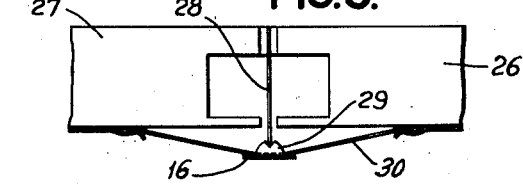
FIG. 6.
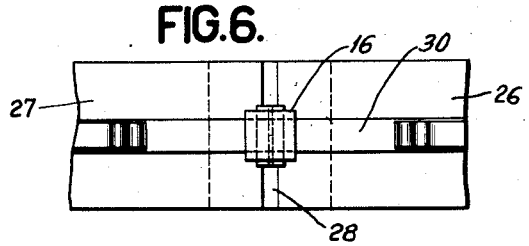
INVENTOR
Arthur H. Dickinson
BY
W. M. Wilson
ATTORNEY July 1, 1941.　　　A. H. DICKINSON　　　2,247,908
APPARATUS FOR RECORDING STATISTICAL DATA
Filed July 25, 1939　　　6 Sheets-Sheet 2

INVENTOR
Arthur H. Dickinson
BY
ATTORNEY

July 1, 1941.　　　A. H. DICKINSON　　　2,247,908
APPARATUS FOR RECORDING STATISTICAL DATA
Filed July 25, 1939　　　6 Sheets-Sheet 3
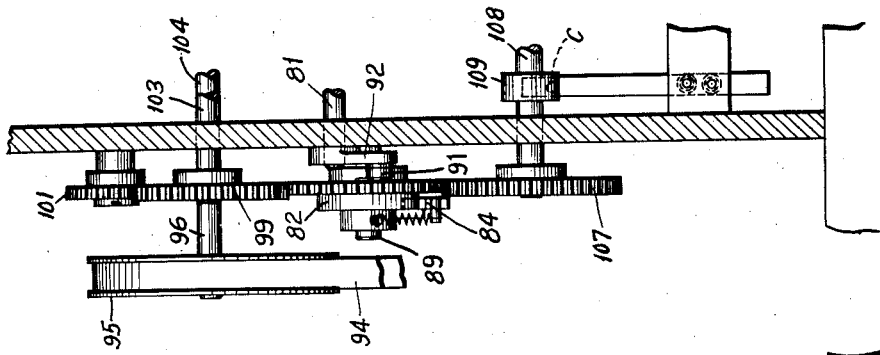
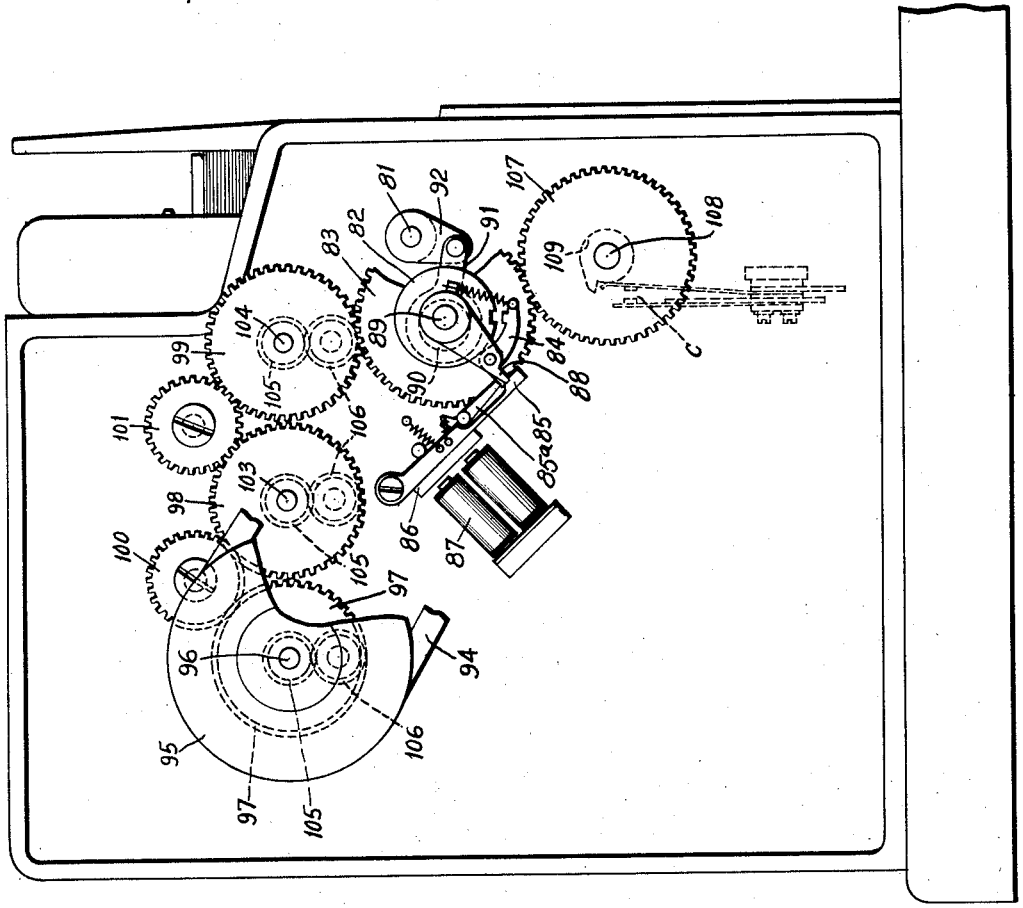
INVENTOR
Arthur H. Dickinson
BY
ATTORNEY July 1, 1941. A. H. DICKINSON 2,247,908
APPARATUS FOR RECORDING STATISTICAL DATA
Filed July 25, 1939 6 Sheets-Sheet 4
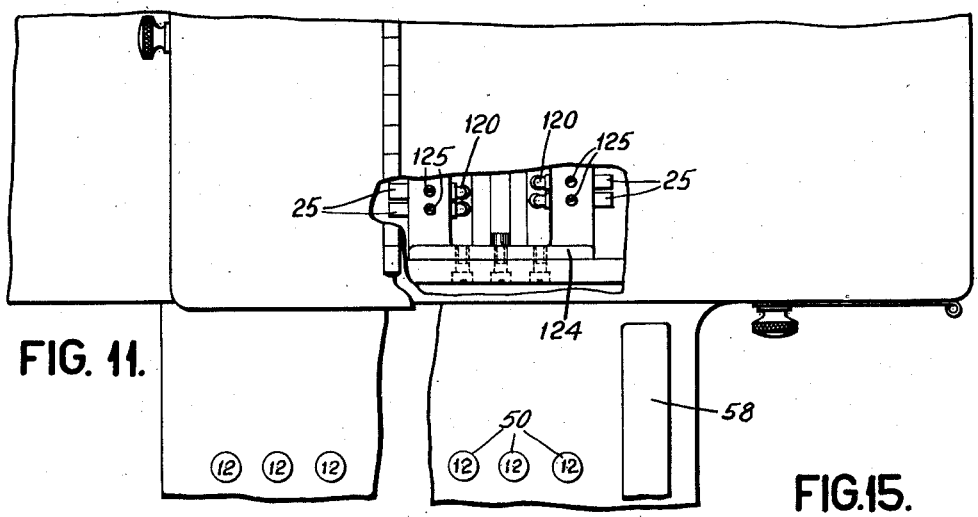
FIG. 11.
FIG. 15.
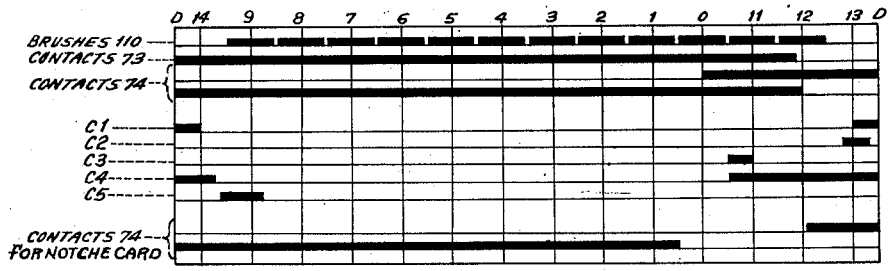
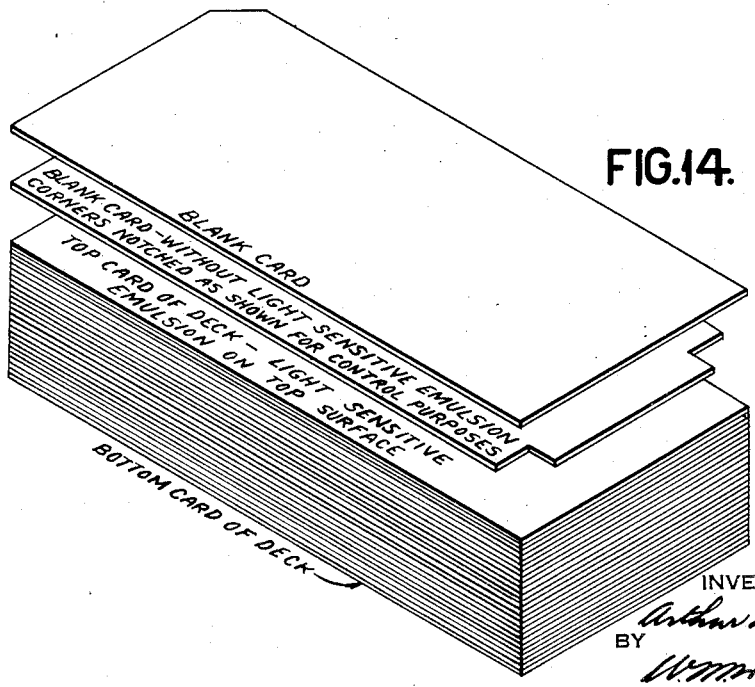
FIG. 14.
INVENTOR
Arthur H. Dickinson
BY
ATTORNEY July 1, 1941.  A. H. DICKINSON  2,247,908
APPARATUS FOR RECORDING STATISTICAL DATA
Filed July 25, 1939  6 Sheets-Sheet 5

INVENTOR
BY
ATTORNEY

July 1, 1941.  A. H. DICKINSON  2,247,908
APPARATUS FOR RECORDING STATISTICAL DATA
Filed July 25, 1939   6 Sheets-Sheet 6

INVENTOR
Arthur H. Dickinson
BY
ATTORNEY

Patented July 1, 1941

2,247,908

UNITED STATES PATENT OFFICE 2,247,908

APPARATUS FOR RECORDING STATISTICAL DATA

Arthur H. Dickinson, Scarsdale, N. Y., assignor to International Business Machines Corporation, New York, N. Y., a corporation of New York Application July 25, 1939, Serial No. 286,445

6 Claims. (Cl. 234—1.5)

This invention pertains broadly to statistical systems and more specifically relates to apparatus for recording statistical data upon records in the form of index marks which are adapted for use in statistical machines, the said index marks controlling the statistical operatons of the machine.

Heretofore, it has been customary to employ differently positioned index marks in different columns on the record elements or mediums for controlling the operations of statistical systems and having all the index marks in the different columns formed in precisely the same manner. For example in the Hollerith system differentially positioned perforations are employed to represent the data, the size of which are all the same in the different columns on the record cards. In other suggested systems employing graphical characters on the record mediums in combination with different forms of analyzing devices the configurations of the index marks vary, but solely for the purpose of identifying the value of the data representing marks.

In none of the systems suggested have index marks of different patterns or variations been used for determining the value of the representing mark by virtue of its differential position and in addition thereto by virtue of its configuration or pattern denote its columnar value or relationship with respect to the record medium. In most of the systems referred to, wherein the different columns or orders of data are sensed concurrently, columnar segregation or differentiation is obtained by the use of individual circuits or control elements, one for each column or order of data to be sensed, which in turn control the connected control means representing and controlling the individual and different orders of the data manifesting means.

It is now suggested that in the electrically controlled statistical systems, wherein different columns of data are sensed or analyzed concurrently for control purposes, a single control channel between the data sensing and data manifesting sections be employed instead of the multiple channels or conductors used at the present time. In addition thereto it is suggested to provide in the simplified and improved statistical system a novel combination of elements comprising in part data sensing means for analyzing concurrently the differentially positioned index marks on the records to initiate during the analyzing or sensing cycle differentially timed electrical impulses of different frequencies, a different frequency for each column of data sensed, which are impressed upon the common circuit or channel connecting the said data sensing and manifesting sections. In this manner columnar segregation or differentiation of the data is obtained.

The subject matter of the instant application relates solely to the method of and means for producing the novel records provided with the differentially positioned index marks, which marks are formed by or recorded in different frequency representations. Means are provided whereby the selected data to be recorded is suitably stored for controlling the recording operations. Such means, in the instant disclosure, comprise manually operable keys which upon depression are latched in a depressed position for maintaining the selection of the desired control circuits. The coupling of suitable frequency generators to timed impulse emitting devices is controlled by the selected keys so that electrical energy can be converted at different times to the corresponding light values. Galvanometer type relays are used for converting the oscillations of different frequencies to varying light rays so that the frequencies of the light variations correspond to the selected frequencies. Recordings are made photographically of the light variations at various positions in the individual columns of the records to represent thereby the selected data.

Accordingly, an object of the present invention resides in the provision of means for recording statistical data selectively in columnar areas on blank sheets, said data being represented by differentially positioned index marks having varying configurations.

Another object of the present invention resides in the provision of means whereby the recorded index marks are formed so as to have different light controlling properties.

Another object of the present invention resides in the provision of means for recording the index marks having different light controlling properties at different index mark positions on the sheet so as to represent by their differential positions the different values of the data.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a fragmentary view of a portion of the control record.

Fig. 2 is a diagrammatic view of the record recording means.

Fig. 3 is a detail view taken along the lines 3—3 of Fig. 2.

Fig. 4 is a detail view taken along the lines 4—4 of Fig. 2.

Figs. 5 and 6 are detail views of the galvanometer relay.

Fig. 7 is a schematic view showing the projected light beam image upon the recording aperture.

Fig. 9 is an end view of the gear box of the machine.

Fig. 10 is a side view of the gearing shown in Fig. 9.

Fig. 11 is a detail view of the galvanometer relay mounting arrangement.

Fig. 14 is a diagrammatic view of a preferred arrangement of a card deck.

Fig. 15 is a timing chart of certain of the control elements of the machine.

Figure 16:
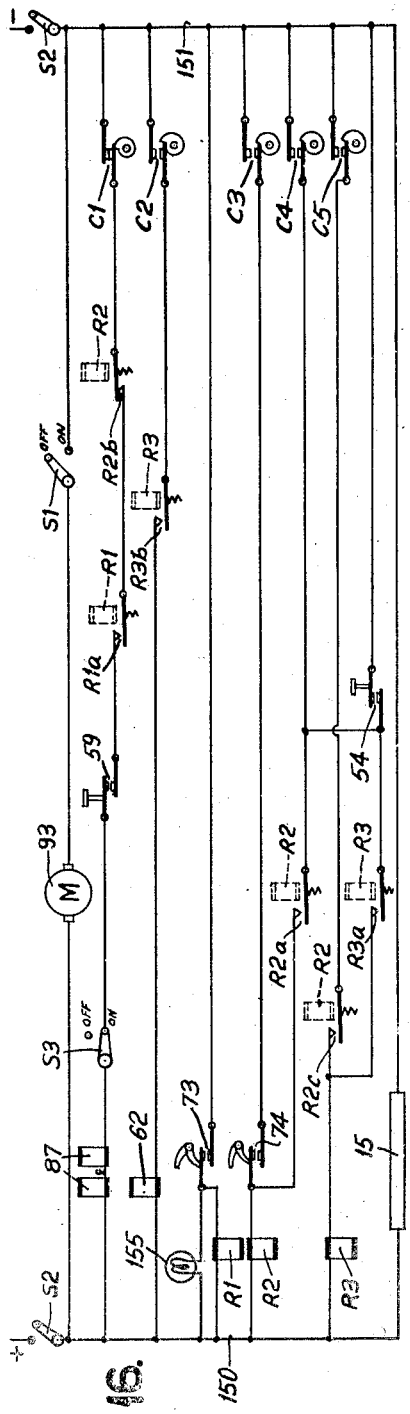
Figure 17:
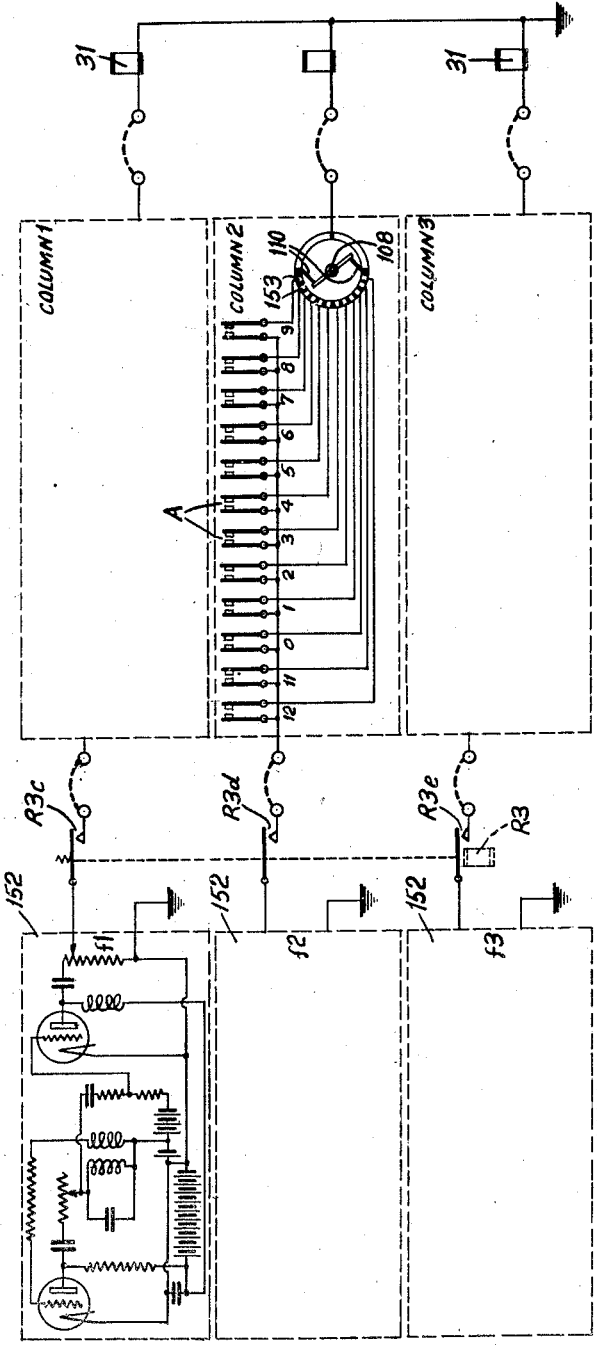

Figs. 16 and 17 taken together show a wiring diagram of the circuit connections of the machine.

Control records

Referring to Fig. 1 a preferred type of light controlling records adapted for use in the statistical machines referred to and which are produced by the machine to be described presently will now be described. The reference numeral 10 designates a record card similar to the type now used in the present Hollerith statistical system which is shown divided into different columns as indicated at a, b, c, etc. Each column is divided into twelve index point or mark positions, so that the positioning of the index marks at these different positions in the different columns denotes the different values of the data represented by the index marks. The differently positioned index marks are shown in the said figure and indicated by the reference numeral 11. It is to be noted that the configurations of the index marks in the different columns which in Fig. 1 comprise graphical wave forms or patterns are different with respect to each other. It is seen that the light and dark portions of the index mark areas are arbitrarily arranged so as to produce differently shaped wave forms or patterns. The purpose of the described arrangement is for controlling the changes in the amount of light directed to cooperating light sensing devices whenever the index marks are scanned or sensed by rays of light.

The record card 10 is opaque, and it is well known that varying amounts of light are reflected by light and dark areas on control records which are scanned by light rays, the frequency of the light variations depending upon the arrangement of the light controlling portions or areas. It is seen that the configurations of the graphical patterns at the different index mark positions in the columns differ with respect to each other, and for illustrative purposes, assume that the configurations are so shaped so that the index mark 11 in the column designated a is effective to cause f1 variations in the light reflected thereby, or stated in other words represents a frequency of f1, the index mark in column b represents frequency f2, the index mark in column c represents frequency f3, etc. The varying patterns of the index marks may be printed in black ink or record cards affording a white background for the marks, or if desired the light controlling records may be made photographically in accordance with well known photographic methods. However, it is preferred that the record cards be provided with a light sensitive surface so that individual light controlling patterns or graphs can be formed thereon photographically. The description to follow is based upon producing the latter type of control record.

Method of recording data

Referring now to Figs. 2 to 7 the method of and means for recording the index marks will be described. The control sheet 10, the top surface of which is coated with a suitable light sensitive emulsion, is advanced in the direction of the arrow at a uniform rate by means of the pairs of feed rolls 12, 13 and 14 (also see Fig. 8). Suitable lens systems are provided for projecting the rays of light from a suitable light source 15 (which may be of the tubular type and sufficient in length to extend along the length of the record card) to a suspended reflecting mirror 16 and thence to a predetermined point (which will be termed the recording position or station) or position of the advancing card to effect recording at the said point or position. One lens system for projecting the rays of light from the source 15 to the mirror 16 comprises the individual lenses 17 and 18 between which is interposed a light limiting disk 19 having an aperture 20 (see Fig. 3) the shape of which determines the shape of the beam of light projected to the mirror. The second lens system for projecting the light rays from the mirror to the record comprises the lenses 21 and 22 between which is interposed a light limiting disk 23 having an aperture 24 (see Fig. 4). Now, as long as the mirror 16 is stationary, a constant beam of light will be projected upon the advanced record 10 along a predetermined column thereof. Due to the shapes of the light limiting disks 19 and 23 the width of the beam of light projected on the record will be one half of the width of the aperture 24 of the disk 23 as shown in Fig. 7. Assume that the width of the aperture 24 permits a beam of light to be projected having a maximum width equivalent to the width of one column on the record card, it is then seen that the constant beam projected upon the card (due to the said shaped apertures) is equivalent in width to one half the width of the columnar area of the card. By means of the said mirror the beam of light projected thereon will be oscillated with respect to the aperture 24 (as indicated by the arrows in Fig. 7) thus causing variable amounts of light to be projected thereon and consequently varying amounts of light will be projected on the columnar area of the sheet to effect the recording of different wave shapes thereon, some of which are shown in Fig. 1. The principle of the galvanometer for oscillating a suspended mirror is well known and therefore it is deemed sufficient merely to refer to this type of galvanometer briefly. The said galvanometer comprises a permanent magnet 25 provided with pole pieces 26 and 27 which are adapted to hold an armature 28 at one end thereof. The free end of the armature is provided with a knife edge which cooperates with the support 29 for the mirror 16. A phosphor bronze ribbon 30 is secured at each end to the pole pieces 26 and 27 for holding the mirror support 29 against the armature. A suitable coil 31 is provided for surrounding the armature 28, so that whenever fluctuating or oscillating impulses are impressed upon the said coil the armature is caused to be vibrated in accordance with the frequency of the oscillations thereby causing the wave form recordings on the records to vary in accordance with the varying amount of light projected to or impressed thereon.

Figure 8:
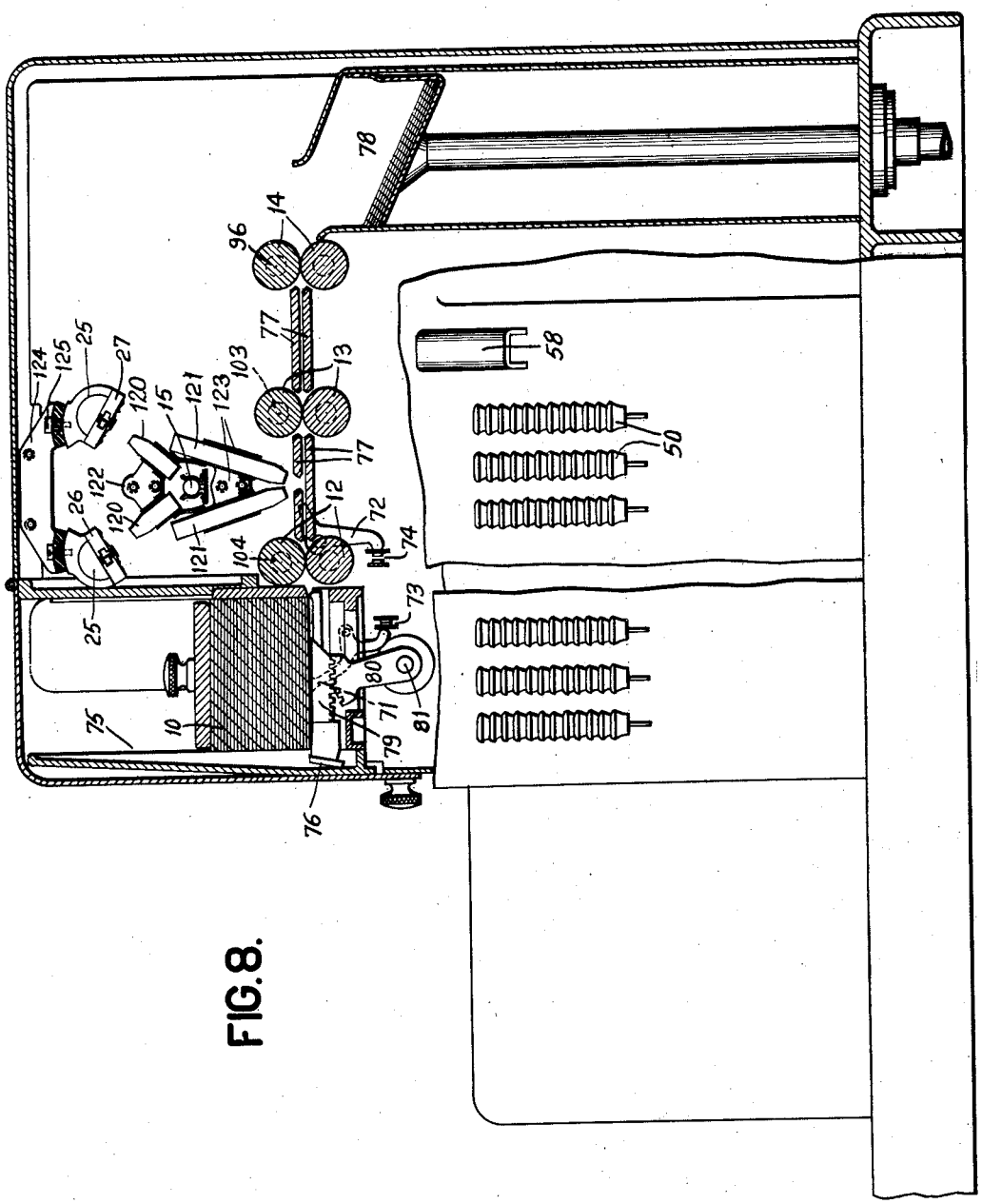
Fig. 8 is a part sectional and part elevational view of the machine showing the keyboard section in elevation and the card feeding means in section.

Before describing the operations of the recording machine the different control units thereof will be described first. Referring to Fig. 8, a section of the card feeding and recording means is shown along with a front view of the keyboard section of the machine.

Keyboard section

Figure 12:
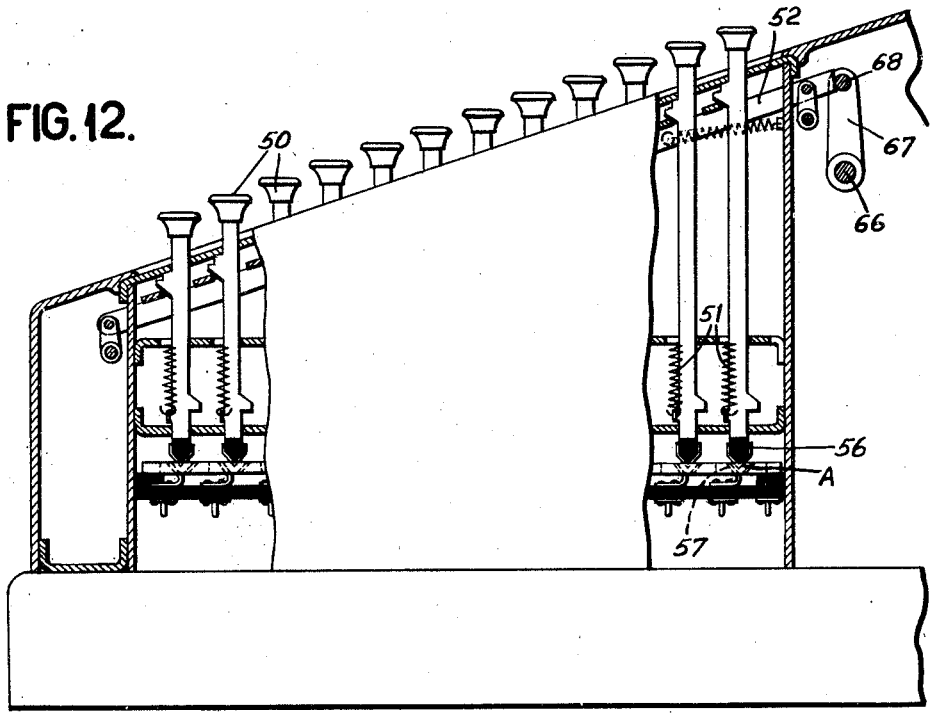
Fig. 12 is a sectional view of the keyboard section.
Figure 13:
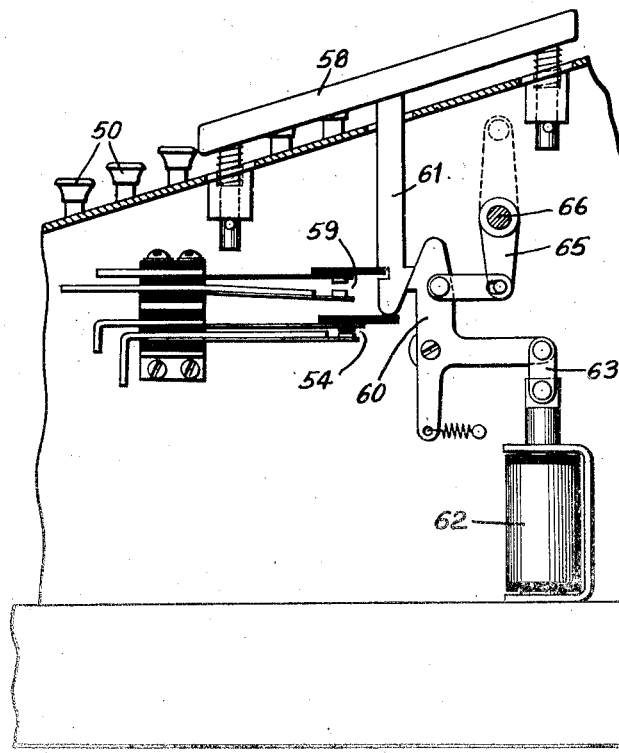
Fig. 13 is a detail view of the keyboard section showing the key and motor bar release mechanism.

Referring now to Figs. 8, 12 and 13 the keyboard section is shown to comprise a plurality of columns or orders of individual keys. The number of keys in each order can vary as desired, however, in the instant case an individual key is provided for each index mark or point position in the individual columns of the sheets. The purpose of the keyboard section is to provide means for storing the selected data which it is desired to record.

Provision is made whereby upon depression of the individual keys 50 against the action of the associated springs 51 they are held latched in the depressed positions by the related latch bars 52 (of which one for each order of keys is provided). Each keybar is provided with a V-shaped conducting portion 56 adapted to engage, upon depression of the associated key, the related contact 57. This connection will be referred to as contacts A on the wiring diagram.

The recording operations of the machine are initiated by the manual operation of a motor bar 58, the depression of which causes the contacts 54 and 59 to be closed. By means of a latch lever 60 the depressed bar is maintained so, due to the engagement of the stem 61 of the bar with the said latch lever. Upon completion of the recording cycle means are provided, such as solenoid 62, to be energized to restore the motor bar to its normal position. It is seen that energization of the solenoid causes pivoted latch member 60 to be partially rotated in a clockwise direction upon displacement of the solenoid plunger by means of the link 63 thereby releasing the latched stem 61 of the motor bar.

During the said rotation of latch member 60 and after the release of the motor bar the link 64 causes lever 65 to be partially rotated and in turn to rotate the shaft 66 in a counterclockwise direction. Rotation of shaft 66 effects displacement of the arm 67 (secured to said shaft) and transverse bail 68, which bail, upon being rocked, thrusts the latch bars 52 forwardly (to the left as viewed in Fig. 12) releasing any depressed keys which have been latched down. For a more detailed description of this well known type of keyboard, reference may be made to U. S. Patent No. 2,147,626.

Record feeding means

Referring now to Figs. 8 to 10 suitable record feeding means will be described. The mechanism for feeding the individual cards 10 from the magazine 75 (which is housed in a light proof chamber) is well known in the statistical machine art and comprises a card picker 76 which is adapted to feed the cards singly from the bottom of the stack to the first pair of feed rolls 12 and thence through the guide plates 77 to the card hopper 78 (which hopper is also housed in a light proof chamber) by the remaining pairs of feed rolls 13 and 14.

The card picker is shown secured to rack 79 which is reciprocated by the gear sector 80 which sector is secured to shaft 81 (see Fig. 9). The operation of the said shaft is under control of the electromagnetically controlled clutch device which comprises in part a single tooth ratchet 82 secured to gear 83 and a pivotally mounted cooperating pawl 84 which is shown held in a latched position by latch member 85 which member is fastened to the armature 86 associated with magnet 87. The latch member 85 is provided with a pivotally mounted and spring urged stop member 85a which is arranged to prevent any backward movement of pawl 84 and arm 88 when the latter are in a latched position. Upon energization of the said magnet the latch member 85 is positioned to release the pawl 84 and arm 88 (which arm is secured to shaft 89 and carries the said pawl 84) thereby permitting the said pawl to cooperate with the ratchet 82 and rotate the said pawl, arm and shaft 89 in unison with gear 83 and ratchet 82. An eccentric 90 secured to shaft 89 is then effective to impart an oscillatory movement to the eccentric extension arm 91 and cooperating arm 92, the latter being fastened to shaft 81 for oscillating the shaft 81 and gear sector 80 thus causing the card picker 76 to function as described.

The means provided for driving the gear 83 and ratchet 82 comprises a constant speed motor 93 (see Fig. 16) for driving the belt 94 and drive pulley 95 which is secured to shaft 96. A gear 97 fastened to the said shaft drives gears 98 and 99 through the idler gears 100 and 101 respectively. The gears 97, 98 and 99 are secured to the upper feed roll shafts 96, 103 and 104 respectively. The drives to the lower feed rolls are by means of gears 105 which are secured to the upper feed roll shafts and gears 106, the latter being secured to the lower feed roll shafts. Now as long as the motor is energized the described gearing is operated to rotate constantly the gear 83 which is rotatably mounted on shaft 89. Gear 83 also drives gear 107 secured to shaft 108 to rotate the cams 109 and brushes 110 of the emitter devices (see Figs. 16 and 17). One of the said cams is shown in Fig. 9 and arranged for controlling the operation of the associated contacts C.

Now it is understood that upon energization of magnet 87 the clutch mechanism is effective to couple the driving means to shaft 89 thus causing the card picker to effect feeding of the individual cards to the feed rolls. As the cards are advanced they pass under the recording mechanism which will now be described.

It should be mentioned that the usual card controlled contacts 73 and 74 are provided to be operated by the levers 71 and 72 respectively. Contacts 73 are closed as long as cards remain in the record card magazine 75. Contacts 74 are closed by the cards fed from the magazine just before being advanced to the recording means, the purpose of which will be understood as the description progresses.

Recording means

Referring now to Figs. 8 and 11 the arrangement of the recording means will be described. The common tubular light source 15 is arranged to extend transversely across the machine and corresponds in length to the length of the cards and serves as a source of light rays for all the individual recording devices provided in the machine. An individual recording device is provided for each column of recording desired upon the cards.

The associated lens systems and galvanometers are shown in a staggered relationship thus providing for the possibility of being able to form the columns of recording closer together. The reference character 120 designates the assembly of the individual lenses 16 and 17 and disk 19 in a suitable housing or case and reference character 121 designates the assembly of the lenses 21 and 22 and disk 23 in a similar housing. The individual assemblies 120 are shown supported by member 122 and assemblies 121 by member 123, the said members being suitably secured and supported by the side frames of the machine. The galvanometers are supported by the member 124. An adjustment is provided whereby the galvanometer mirror can be positioned so as to obtain the relation of the reflected light beams and aperture 24 as shown in Fig. 7. The magnet 25 of the galvanometer is provided with an arcuate surface which is fastened against a similar arcuate surface of the supporting member 124 by suitable means such as the screw 125. The said supporting member is provided with an elongated opening through which the screw extends so that the magnet can be fixedly secured at one of several adjusting positions. Positioning the magnets in this manner has the effect of rotating the mirror 16 about its axis.

*Operation of the machine*

Referring now to Figs. 16 and 17 the operation of the machine will be explained in conjunction with the circuit diagram shown. Assume that the cards are properly placed in the card magazine, that switches S1, S2, and S3 are closed, that the selected data is set up on the keyboard section and stored by the latched keys when the motor bar 58 is depressed to initiate the recording operations. A circuit is then completed from conductor 150 to the clutch control magnet 87, switch S3, contacts 59, R1a, R2b, and C1 to conductor 151, energizing the said magnet and thereby causing the card feeding means to be effective to feed a card from the magazine to the recording means. Before the card is advanced past the recording means contacts 74 are closed and upon closure of contacts C3 a circuit is completed from the conductors 150 and 151 to relay R2, energizing the said relay and establishing a holding circuit therefor through contacts R2a and the contacts 54 (and contacts C4 connected in a parallel circuit with contacts 54). The contacts R2b open the circuit to the card feed clutch magnet and prevent energization of this magnet when contacts C1 close again later in the cycle (see Fig. 15). Relay R3 is energized when contacts C5 close since contacts R2c at this time are closed, thereby establishing a holding circuit for this relay throughout the recording cycle through contacts R3a and contacts 54, and due to the overlap in timing of the contacts C4 with respect to contacts 54 the said holding circuit is maintained for a short time after the recording operations are completed. Closure of contacts R3b permits the release solenoid 62 to be energized after the recording operations have been completed upon closure of contacts C2 for restoring the depressed keys to normal as described hereinabove.

Contacts R3c to R3e are also closed upon energization of relay R3 so that the oscillation generators 152 are connected to the associated contacts A of each order of the keyboard section as the card is advanced under the recording means. The oscillation generators 152 may be of any well known type of frequency generator such as the rotary generator type or the well known electronic generator type illustrated in the drawings. Since these generators per se are not claimed, it is believed that further description thereof is not necessary other than to state that each generator is adjusted to generate a different frequency as indicated by the notations f1, f2, etc. It is understood that as many frequency generators as desired may be provided, and in such cases where it is desired to record each column of data in a different frequency, one generator is provided for each column of data to be recorded on the record.

It was mentioned hereinabove that the brushes 110 of the impulse emitter device are rotated by the shaft 108 and are arranged during rotation thereof to engage the individual conducting segments 153 in succession and in timed relationship with the advancement of the index mark positions of the cards past the recording position. For example as the "9" index mark position on the card is advanced to the recording position the said brushes engage the conducting segment 153 connected to the contacts A of the "9" key of the keyboard section so that a circuit is completed at that specific timed interval to the connected galvanometer coil 31. Thus, it is seen that as the card is passing the recording position circuits are completed so that the outputs of the frequency generators are connected through the closed contacts A representing the data to be recorded and the emitter devices to the connected galvanometer coils 31 at particular timed intervals corresponding to the data to be recorded so that the oscillations of the generators are impressed upon the galvanometer coils only at the said timed intervals to energize the said coils. The corresponding armatures of the galvanometers are then vibrated in accordance with the frequencies of the oscillations so as to project varying amounts of light upon the records at the particular index mark positions in the predetermined columns. The data is recorded in this manner so that not only are the representations or index marks formed on the cards at differential index mark positions but also recorded in different frequency values accordingly (see Fig. 1).

It was mentioned that later in the machine cycle after the recording operations have been effected contacts C2 are closed to energize solenoid 62 thus restoring the latched data keys and keybar to a normal unlatched position restoring the control circuits to normal. After the data again is selected and set up on the keyboard other recording operations can be effected just as described.

Since the cards used in the described recording machine are light sensitive provision is made for placing stacks of cards in the machine without exposing the light sensitive emulsion, also since the card magazine recording means and stacker are all encased in light proof housings means are provided to indicate when the last card has been used. It is preferred to arrange the cards in decks or stacks before inserting them into the machine as shown in Fig. 14. Two blank cards are provided on the top of the stack of sensitized cards. The blank card on top is used as a light proof cover, the second blank card from the top is one which is notched as shown for the following purpose. As the notched card, which in effect is the last card, but the preceding card is the last sensitized card, is fed through the machine the timing thereof will be affected (see Fig. 15). Due to the notched sections of the card the contacts 74 are not closed in the cycle until contacts C3 have been operated. In this manner, relay R2 is not energized, therefore, the release solenoid will not be energized and the card feed clutch magnet will be energized a second time to effect two successive card feeding operations. The cover card is then fed through the machine causing contacts 73 to be opened and thereby prevent further operation of the machine. An indicating lamp 155 is provided which is energized as long as contacts 73 are closed, thus deenergization of the lamp will be an indication of the conditions just described.

The novel control records described herein are claimed in a copending application Serial No. 286,444 filed July 25, 1939.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A device of the character described for recording statistical data in different columns upon control sheets at a recording station comprising means for feeding the individual sheets past the recording station, a plurality of recording means at the said recording station, one for each column of data to be recorded, a plurality of sources of oscillations of different frequencies, one of said sources for each column of data to be recorded and means for coupling the sources of said oscillations to the related recording means to influence the latter and effect recording of the data in different columns on the said sheets in different frequencies.

2. A device of the character described for recording statistical data in different columns upon control sheets at a recording station comprising means for feeding the individual sheets past the recording station, a plurality of recording means at the recording station, one for each column of data to be recorded, a plurality of sources of oscillations of different frequencies, one for each column of data to be recorded, means for coupling the sources of said oscillations to the related recording means to influence the latter for effecting recording of the data in different columns on the said sheets in different frequencies, and means for rendering the coupled sources of oscillations effective at differential times during the passage of the sheets past the recording station for influencing the said recording means thereby effecting recording of the different frequencies at differential positions in the columns on the sheets.

3. A device of the character described for recording statistical data in different columns upon control sheets at a recording station comprising means for feeding the individual sheets past the recording station, a plurality of recording means at the recording station, one for each column of data to be recorded, a plurality of sources of oscillations of different frequencies, one for each column of data to be recorded, means for storing the selected data to be recorded on the sheets including means for retaining the stored data in the storing means during the recording operations, means for coupling the sources of oscillations to the related recording means to influence the latter for effecting recording of the data in different columns on the said sheets in different frequencies, and means controlled by the said storing means for rendering the coupled sources of oscillations effective at differential times during the passage of the sheets past the recording station for influencing the said recording means thereby effecting recording of the different frequencies at differential positions in the columns on the sheets.

4. The invention set forth in claim 3 wherein means are provided for restoring automatically the data storing means to normal condition after the recording operations have been effected.

5. A device of the character described for recording statistical data in different columns upon control sheets at a recording station comprising means for feeding the individual sheets past the recording station, said records being provided with light sensitive coatings, a plurality of recording means at the said recording station, one for each column of data to be recorded, each recording means comprising means for varying selectively the amounts of light projected to the said sheets, a plurality of sources of oscillations of different frequencies, one for each column of data to be recorded, and means for coupling the sources of said oscillations to the related recording means to influence the latter and effect recording of varying wave shapes in accordance with frequencies of the oscillations impressed on the recording means thereby representing the data in different columns on the said sheets in different frequencies.

6. The invention set forth in claim 5 wherein means are provided for rendering the coupled sources of oscillations effective at differential times during the passage of the sheets past the recording station for influencing the said recording means thereby effecting recording of the different wave shapes at different positions in the columns on the sheets.

ARTHUR H. DICKINSON.